US012764373B2

(12) United States Patent
Xuan et al.

(10) Patent No.: US 12,764,373 B2
(45) Date of Patent: Oct. 13, 2026

(54) LIVE CONTENT PRESENTATION METHOD AND APPARATUS, ELECTRONIC DEVICE, AND READABLE STORAGE MEDIUM

(71) Applicant: Beijing Zitiao Network Technology Co., Ltd., Beijing (CN)

(72) Inventors: Hui Xuan, Beijing (CN); Mengying Fang, Beijing (CN); Can Yang, Beijing (CN); Yijie Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/393,573

(22) Filed: Dec. 21, 2023

(65) Prior Publication Data

US 2024/0129575 A1 Apr. 18, 2024

Related U.S. Application Data

(63) Continuation of application No. PCT/CN2022/114525, filed on Aug. 24, 2022.

(30) Foreign Application Priority Data

Oct. 11, 2021 (CN) .......................... 202111183746.7

(51) Int. Cl.
*H04N 21/431* (2011.01)
*H04N 21/2187* (2011.01)
(Continued)

(52) U.S. Cl.
CPC ....... *H04N 21/431* (2013.01); *H04N 21/2187* (2013.01); *H04N 21/44008* (2013.01); *H04N 21/472* (2013.01)

(58) Field of Classification Search
CPC ............. H04N 21/431; H04N 21/2187; H04N 21/44008; H04N 21/472
See application file for complete search history.

(56) References Cited

U.S. PATENT DOCUMENTS 8,893,010 B1 * 11/2014 Brin ................... G06Q 30/0635 715/738
11,290,687 B1 * 3/2022 Becchetti ................. H04N 7/15
(Continued)

FOREIGN PATENT DOCUMENTS

CN 107038201 A 8/2017
CN 109413483 A 3/2019
(Continued)

OTHER PUBLICATIONS

"How to Enable Control Centre on iPhone 7 & 7 Plus in 2021! [Easy] [Acess, Get & Open]." YouTube, uploaded by Saunderverse, Dec. 26, 2020, youtube.com/shorts/DXZuU_YrY-Q (Year: 2020).*
(Continued)

*Primary Examiner* — Michael R Telan

(57) ABSTRACT

The present disclosure relates to a live content presentation method and apparatus, an electronic device, and a readable storage medium. The method includes: receiving a trigger operation on a target entry; and in response to the trigger operation on the target entry, presenting a profile page of a target user, and in response to determining that the target user is on a live, presenting live preview content in a background image area comprised in the profile page, wherein the live preview content is generated in accordance with an image of a live room of the target user.

17 Claims, 6 Drawing Sheets

(51) Int. Cl.

| | |
|---|---|
| ***H04N 21/44*** | (2011.01) |
| ***H04N 21/472*** | (2011.01) |

(56) References Cited

U.S. PATENT DOCUMENTS

| | | | | |
|---|---|---|---|---|
| 2008/0066010 | A1 | 3/2008 | Brodersen et al. | |
| 2013/0019147 | A1 | 1/2013 | Chand | |
| 2013/0205408 | A1* | 8/2013 | Yerli | G06F 21/6254 726/28 |
| 2014/0019882 | A1* | 1/2014 | Chew | G06Q 10/10 715/753 |
| 2014/0280530 | A1* | 9/2014 | Fremlin | H04L 67/306 709/204 |
| 2016/0277802 | A1* | 9/2016 | Bernstein | H04N 21/44213 |
| 2018/0192141 | A1* | 7/2018 | Akumiah | H04N 21/41407 |
| 2018/0353865 | A1* | 12/2018 | Bamba | G06F 3/0484 |
| 2019/0320032 | A1 | 10/2019 | Fu | |
| 2020/0366963 | A1 | 11/2020 | Liao | |
| 2022/0247919 | A1* | 8/2022 | O'Leary | H04N 5/2628 |
| 2022/0279217 | A1 | 9/2022 | Yao et al. | |
| 2023/0027231 | A1* | 1/2023 | Smith | H04N 21/47 |
| 2023/0319399 | A1* | 10/2023 | Gupta | H04N 1/2125 348/220.1 |

FOREIGN PATENT DOCUMENTS

| | | | |
|---|---|---|---|
| CN | 110740339 | A | 1/2020 |
| CN | 110996151 | A | 4/2020 |
| CN | 111045565 | A | 4/2020 |
| CN | 111408145 | A | 7/2020 |
| CN | 306249308 | S | 7/2020 |
| CN | 112153396 | A | 12/2020 |
| CN | 112714363 | A | 4/2021 |
| CN | 112765375 | A | 5/2021 |
| CN | 113015012 | A | 6/2021 |
| CN | 113055750 | A | 6/2021 |
| JP | 2016-512642 | A | 4/2016 |
| JP | 2020-191620 | A | 11/2020 |
| WO | 2014/164446 | A1 | 10/2014 |

OTHER PUBLICATIONS

International Search Report and Written Opinion mailed Nov. 14, 2022 in PCT Appl. No. PCT/CN2022/114525, English translation (10 pages).

European Search Report for EP Patent Application No. 22880004.1, Issued on Sep. 9, 2024, 8 pages.

Rofle, "Guide: How to pull to refresh email inbox in the iPhone Mail app l iOS 9", TapSmart, Jun. 4, 2015, pp. 1-2.

Office Action received for European Application No. 22880004.1, mailed on Apr. 23, 2025, 5 pages.

Office action received from Chinese patent application No. 202111183746.7 mailed on Feb. 27, 2025, 20 pages (10 pages English Translation and 10 pages Original Copy).

Office action received from Japanese patent application No. 2023-578996 mailed on Feb. 25, 2025, 16 pages (8 pages English Translation and 8 pages Original Copy).

* cited by examiner

LIVE CONTENT PRESENTATION METHOD AND APPARATUS, ELECTRONIC DEVICE, AND READABLE STORAGE MEDIUM

This application is a continuation of International Application No. PCT/CN2022/114525, as filed on Aug. 24, 2022, which is based on and claims the priority to the Chinese Patent Application No. 202111183746.7 entitled "LIVE BROADCAST CONTENT PRESENTATION METHOD AND APPARATUS, ELECTRONIC DEVICE, AND READABLE STORAGE MEDIUM" filed on Oct. 11, 2021. The disclosure of each of these applications is incorporated herein by reference.

TECHNICAL FIELD

The present disclosure relates to the field of Internet technology, and in particular, to a live content presentation method and apparatus, an electronic device, and a readable storage medium.

BACKGROUND

With the rapid development of Internet technology, an application can provide a function of online live, wherein an anchor user can start the function of online live, and other users can enter an online live room of the anchor user through a live recommendation page provided by the application or searching for the anchor user, and participate in the online live.

At present, the manner of acquiring the live content by the user is so single that the user experience is seriously influenced.

SUMMARY

In order to solve the above technical problem or at least partially solve the above technical problem, embodiments of the present disclosure provide a live content presentation method and apparatus, an electronic device, and a readable storage medium.

In a first aspect, an embodiment of the present disclosure provides method for presenting live content, comprising:

receiving a trigger operation on a target entry; and in response to the trigger operation on the target entry, presenting a profile page of a target user, and in response to determining that the target user is on a live, presenting live preview content in a background image area comprised in the profile page, wherein the live preview content is generated in accordance with an image of a live room of the target user.

In some implementations, the method further comprises:

in response to a trigger operation on the background image area, switching from the profile page to the live room of the target user, to present the image of the live room of the target user.

In some implementations, the in response to a trigger operation on the background image area, switching from the profile page to the live room of the target user comprises:

in response to a click operation on the background image area, switching from the profile page to the live room of the target user.

In some implementations, the in response to a trigger operation on the background image area, switching from the profile page to the live room of the target user comprises:

in response to a drop-down operation on the background image area, determining whether the drop-down operation has reached a preset critical point when it ends; and if it is determined that the drop-down operation has reached the preset critical point when it ends, switching from the profile page to the live room of the target user.

In some implementations, the method further comprises: prompting that the drop-down operation has reached the preset critical point.

In some implementations, the prompting that the drop-down operation has reached the preset critical point comprises:

prompting, in the manner of a text prompt and/or a vibration prompt, that the drop-down operation has reached the preset critical point.

In some implementations, the live preview content is obtained by cropping the image of the live room of the target user in accordance with a size of the background image area.

In some implementations, the live preview content is obtained by identifying a visual center of gravity of the image of the live room of the target user and cropping the image of the live room of the target user in accordance with the size of the background image area and the visual center of gravity.

In some implementations, the live preview content is obtained by zooming out the image of the live room of the target user in accordance with a size of the background image area.

In a second aspect, an embodiment of the present disclosure provides an apparatus for presenting live content, comprising:

a receiving module configured to receive a trigger operation on a target entry; and a displaying module configured to, in response to the trigger operation on the target entry, present a profile page of a target user, and in response to determining that the target user is on a live, present live preview content in a background image area comprised in the profile page, wherein the live preview content is generated in accordance with an image of a live room of the target user.

In a third aspect, an embodiment of the present disclosure provides an electronic device, comprising: a memory and a processor, wherein the memory is configured to store computer program instructions, and the processor is configured to execute the computer program instructions to implement the method for presenting live content in accordance with any term of the first aspect.

In a fourth aspect, an embodiment of the present disclosure further provides a non-transitory computer-readable storage medium, comprising: computer program instructions, wherein the computer program instructions, when executed by at least one processor of an electronic device, cause the electronic device to implement the method for presenting live content in accordance with any term of the first aspect.

In a fifth aspect, an embodiment of the present disclosure further provides a computer program product which, when being executed by a computer, causes the computer to perform the method for presenting live content in accordance with any term of the first aspect.

BRIEF DESCRIPTION OF THE DRAWINGS

The accompanying drawings herein, which are incorporated in and constitute part of this specification, illustrate embodiments consistent with the present disclosure and, together with the description, serve to explain the principles of the present disclosure.

In order to more clearly illustrate technical solutions in the embodiments of the present disclosure or the related art, the drawings that need to be used in the description of the embodiments or the related art will be briefly described below, and it is apparent that for those of ordinary skill in the art, other drawings can also obtained in accordance with these drawings without paying out creative efforts.

DETAILED DESCRIPTION

Figure 1A:
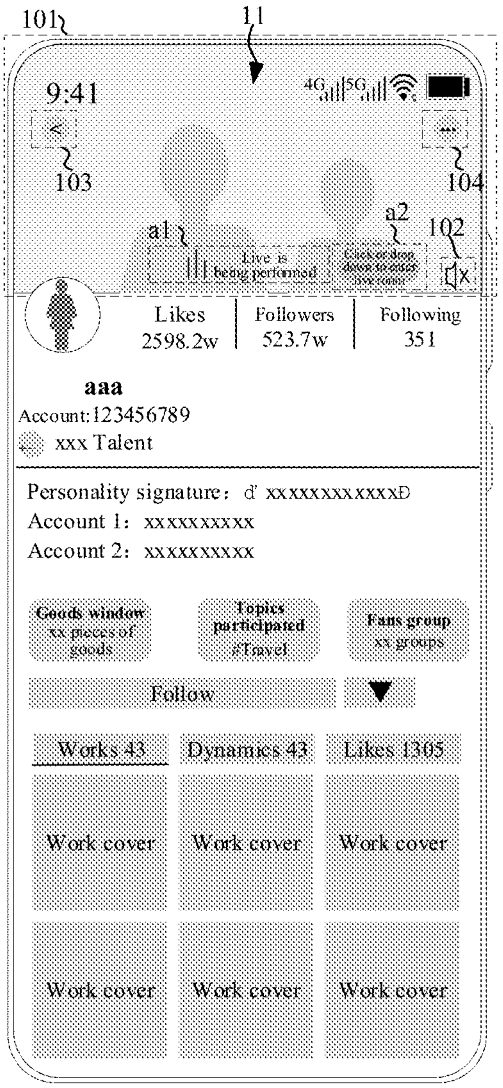
FIGS. 1A to 1F are schematic diagrams of human-computer interfaces provided by embodiments of the present disclosure.

In order that the above objectives, features and advantages of the present disclosure may be more clearly understood, the solutions of the present disclosure will be further described below. It should be noted that, in the case of no conflict, the embodiments of the present disclosure and features in the embodiments may be combined with each other.

In the following description, numerous specific details are set forth in order to provide a thorough understanding of the present disclosure, but the present disclosure may be implemented in other ways than those described herein; and it is apparent that the embodiments in the description are only a few embodiments of the present disclosure, but not all embodiments.

Exemplarily, the present disclosure provides a live content presentation method and apparatus, an electronic device, a readable storage medium, and a computer program product, wherein the method comprises: receiving a trigger operation on a target entry; and in response to the trigger operation on the target entry, presenting a profile page of a target user, and in response to determining that the target user is on a live, presenting live preview content in a background image area comprised in the profile page, wherein the live preview content presented in the background image area is generated in accordance with an image of a live room released by the target user, such that the following is achieved: a user can view the live content released by the target user when entering the profile page of the target user, which enriches the channel for a user to preview the live content, and helps raising a motivation of the user to enter the live room page, and improves the user experience.

Herein, the background image area of the profile page mentioned in the present disclosure is a head image area of the profile page, and the background image area is used for presenting a profile page background image and is usually located at a top area of the profile page. Herein, for the background image of the profile page, a default background image may be used, and user customization may also be supported, which is not limited in the present disclosure.

Herein, the live content released by the target user may include: video performance, content recorded in real time, pre-recorded content, and the like, which is not limited in the present disclosure.

Herein, the method for presenting live content provided in the present disclosure is executed by an electronic device. The electronic device may be an internet of things (IOT) device, such as a tablet computer, a mobile phone (such as a foldable mobile phone, a large screen mobile phone, or the like), a wearable device, a vehicle-mounted device, an augmented reality (AR)/virtual reality (VR) device, a notebook computer, an ultra-mobile personal computer (UMPC), a netbook, a personal digital assistant (PDA), a smart television, a smart screen, a high-definition television, a 4K television, a smart speaker, and a smart projector, and the present disclosure does not impose any limitation on the specific type of the electronic device.

Herein, the present disclosure does not limit a type of an operating system of the electronic device. For example, an Android system, a Linux system, a Windows system, an iOS systems, etc.

Based on the foregoing description, in the embodiments of the present disclosure, by taking the electronic device as an example and combining the accompanying drawings and an application scenario, a detailed description is made to an interaction method provided in the present disclosure.

An implementation process of the method for presenting live content provided by the present disclosure is described in conjunction with FIGS. 1A to 1F. For convenience of the description, the electronic device is a mobile phone, where a short video social application (hereinafter, referred to as application 1) is installed, and a user 1 is a live user who is on a live.

FIGS. 1A to 1F are schematic diagrams of human-computer interaction interfaces provided by embodiments of the present disclosure.

Herein, when the application 1 receives a trigger operation for entering a profile page of the user 1, the application 1 may, on the mobile phone, exemplarily display a user interface 11 as shown in FIG. 1A, wherein the user interface 11 is used for presenting the profile page of the user 1.

Referring to FIG. 1A, the user interface 11 includes: an area 101, which is a background image area. If the user 1 is on a live currently, the area 101 is used for presenting live preview content generated in accordance with an image of a live room of the user 1; and if the user 1 is not on a live currently, the area 101 may present a background image of the profile page corresponding to the user 1; the present disclosure does not limit the background image of the profile page, for example, the background image of the profile page of the user 1 may be a default background image provided by the application 1, or a background image customized by the user 1.

The present disclosure does not limit parameters of the area 101, such as size, display position, shape, and the like. For example, referring to FIG. 1A, the area 101 may be quadrilateral, and the area 101 may be located at a top area of the profile page, that is, the area 101 is located at a top area of the user interface 11.

When the user 1 is on a live currently, the live preview content presented in the area 101 may be generated in accordance with the image of the live room of the user 1. The present disclosure does not limit a type of the live room of the user 1, for example, the live room of the user 1 may be a live room capable of producing a real-time live stream, for example, the live content of the live room of the user 1 is a video performance recorded in real time, a pre-recorded video performance, a movie/TV drama played back, or the like, and furthermore, the live room of the user 1 may also be a non-stream live room, for example, a voice live room, a chat room live room, and the like.

Next, the description is made by taking an example that a live of a video performance recorded in real time is being performed in the live room of the user 1.

Assuming that a live of the video performance recorded in real time is being performed in the live room of the user 1, a live stream will be produced by the live room of the user 1, and the live preview content generated in accordance with the live stream generated by the live room is a live preview stream corresponding to the live stream, then the live preview stream is presented in the background image area (i.e., area 101) of the profile page of the user 1. Other live rooms capable of producing a live stream, which are similar to the live room of the user 1, may all present a live preview stream in the background image area of the profile page of the target user in a manner similar to that described above.

For example, in the area 101, the image of the live content (i.e., the video performance) released by the user 1 in the live room can be displayed, while whether to display other content than the live content in the area 101, for example, comment information released by the user in the live room, or the like, is not limited in the present disclosure. Because the user, when entering the live room, generally pays greater attention to the live content released in the live room than attention to other content presented in the live room, the image of the live content can be mainly presented in the area 101, which conforms to the viewing habit of the user, and can improve the user experience.

In some implementations, the live content may not be image-processed, and the image of the obtained live content is displayed in the area 101.

For example, the size of the area 101 is matched with that of the image of the live content, for example, if the size of the area 101 is greater than or equal to that of the image of the live content, the size of the image of the live content can be kept unchanged to display the live content in the area 101, which can ensure that the user can view the relatively complete image of the live content from the area 101, thereby helping raising the motivation of the user to enter the live room. When the size of the area 101 is greater than that of the image of the live content, other content may be filled in an area that cannot be filled with the image of the live content, for example, the area that cannot be filled with the image of the live content is filled with pure black or pure white.

In other implementations, image processing is performed on the image of the live content to obtain the live preview content, and then the live preview content is presented in the area 101.

For example, by cropping the image of the live content, an image of an area may be selected from the image of the live content for presentation; when cropping, an image presented in the area 101 may be obtained by identifying a visual center of gravity of the image of the live content in real time and cropping the image of the live content in accordance with the size of the area 101 and the visual center of gravity.

Herein, a most delectable image area can be identified and cut-out from the image of the live content by using artificial intelligence technology, and real-time tracking is performed, to make sure that the center of gravity of the image of the live content is always presented in the background image area of the profile page. Alternatively, the image of the live content can be zoomed out so that the image of the live content can be thumbnail-presented in the area 101; alternatively, when the size of the image area of the live content to be cut-out is not matched with that of the area 101, the image of the cut-out live content may be resized, and then the resized image of the live content is presented in the area 101, and if the entire area 101 might not be filled with the resized image of the cut-out live content, then other content may be filled in an area that cannot be filled with the image of the cut-out live content, for example, the area that cannot be filled with the image of the cut-out live content is filled with pure black or pure white.

The presentation mode of the live content released by the user 1 in the area 101 is not limited in the present disclosure, and can be flexibly set as required. In addition, when the live preview content is displayed in the area 101, whether the electronic device is currently in a landscape screen state or a portrait screen state can be considered; for example, when the electronic device is in the portrait screen state, blank-leaving processing can be performed on both sides of the image of the live preview content, and when the electronic device is in the landscape screen state, the image of the live preview content can be made to occupy the entire area 101.

In addition, in the area 101, prompt content for prompting that the user 1 is on a live may also be displayed, which may be implemented by one or more of an image, a symbol, text, animation effects, or the like; for example, referring to FIG. 1A, the prompt content may be displayed in an area a1, where the prompt content includes text "live is being performed" and a symbol with animation effects. The present disclosure does not limit the display parameters of the prompt content, such as display position, size, color, and the like.

Furthermore, the user interface 11 may further include: a control 102 for controlling volume of the live preview content. The control 102 may be implemented by one or more of an image, a symbol, text, or the like. When the application 1 displays the user interface 11, it may be in a mute state by default, that is, audio content included in the live preview content is not played back, and a presentation mode of the control 102 corresponds to the mute state; when the application 1 receives a trigger operation (e.g., a click operation) for the control 102, the application 1 may play back the audio content included in the live preview content, and switch the presentation mode of the control 102 to a mode corresponding to a non-mute state.

The user can repeatedly operate the control 102 to toggle between the mute state and the non-mute state.

Furthermore, the user interface 11 may further include: a control 103 for exiting the profile page of the user 1, an entry 104 for entering a specific page, wherein the user can, by means of the specific page, realize functions such as sharing the user 1, blocking the user 1, sending a private message to the user 1. The present disclosure does not limit implementations and display parameters of the control 103 and the entry 104. For example, the control 103 and the entry 104 each may be implemented by one or more of an icon, text, an image, a symbol, or the like, and the control 103 and the entry 104 may have display positions overlapped with the area 103 and be displayed in an upper layer of the area 101.

In order to minimize shield against the image of the live preview content displayed in the area 101 by the control 103 and the entry 104, the control 103 and the entry 104 can be set to be displayed in a semi-transparent state.

In addition, the user interface 11 may further present related information of the user 1, for example, account information of the user 1, avatar information of the user 1, a personality signature of the user 1, label information of a type to which the user 1 belongs, a work released by the user 1, a work liked by the user 1, an entry for entering a goods window of the user 1, an entry for entering a topic in which the user 1 participates, an entry for entering a fans group of the user 1, and the like.

On the basis of the embodiment shown in FIG. 1A, in response to a trigger operation on the area 101, the application 1 may, on the mobile phone, present a live room page of the user 1, that is, enter the live room of the user 1.

This embodiment exemplarily provides scenarios of entering the live room of the user 1 by a click operation and a drop-down operation on the area 101, respectively, which are respectively described in detail below.

Scenario 1: in response to a click operation on the area 101, entering the live room of the user 1.

In the scenario 1, the user may click any position of the area 101, the application 1 may determine whether the position clicked by the user is a position within the area 101, and if the position clicked by the user is the position within the area 101, the application 1 may jump to the live room page of the user 1; the present disclosure does not limit the implementation of the live room page of the user 1.

Figure 1B:
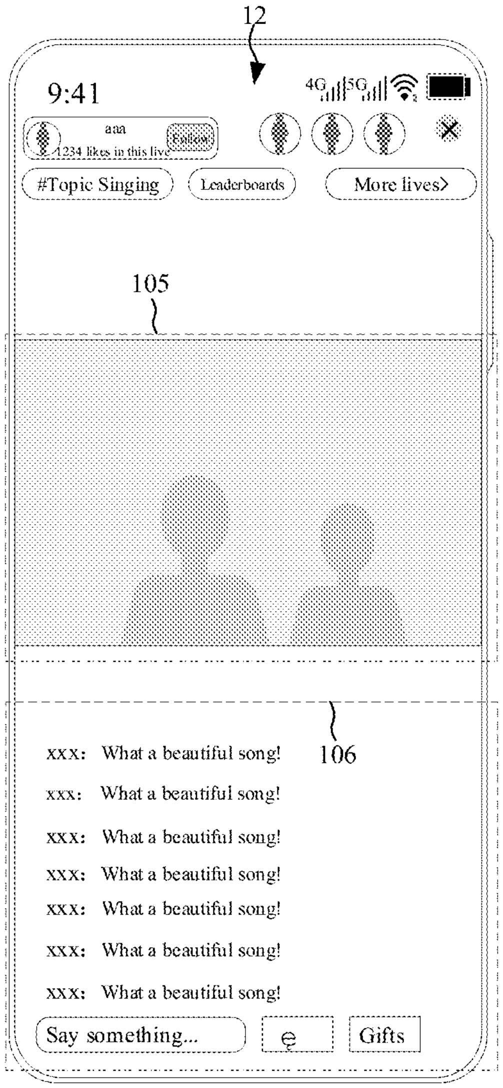

Exemplarily, the application 1 may, on the mobile phone, exemplarily display a user interface 12 shown in FIG. 1B, which is used for displaying the live room page of the user 1.

In FIG. 1B, the user interface 12 includes: an area 105.

The area 105, is used for displaying the live content released by the user 1, and enables the user to view multimedia content released by the user 1. The present disclosure does not limit the parameters of the area 105, such as shape, area position, size, and the like. For example, referring to FIG. 1B, the area 105 is a quadrilateral area located in a middle of the user interface 12. It should be noted that the area 105 may also include an entire display screen of the mobile phone.

In addition, the user interface 12 may further present content such as a follow button for an account associated with the live content released by the user 1, the number of views of the live content played back currently, a title of the live content played back currently, and the like. The user interface 12 may further present a control related to the live content played back currently; for example, a button for exiting the live room, a button for sharing the live content of the current live room, an entry for entering a live recommendation page, an entry for entering a virtual gift presentation interface, and an entry for entering a specific page, wherein the user may, through the specific page, realize functions such as sharing the live room of the user 1 reporting the live room of the user 1, clearing a screen, and the like.

In addition, the user interface 12 may further include an area 106, which is used for displaying a comment interface corresponding to the live content. The comment interface is mainly used for displaying comment information for the live content played back currently. Herein, the present disclosure does not limit the manner of displaying the comment information on the comment interface.

It should be noted that, if the position clicked by the user is not the position within the area 101, the application 1 may jump to another corresponding page in accordance with the position clicked by the user or keep the current user interface 11 unchanged.

Scenario 2: in response to a drop-down operation on the area 101, entering the live room of the user 1.

In the scenario 2, the user may start to drop down from any position of the area 101, and when the application 1 detects that the drop-down operation ends, and the application 1 determines that the drop-down operation has reached a preset critical point, the application 1 jumps to the live room page of the user 1.

Figure 2:
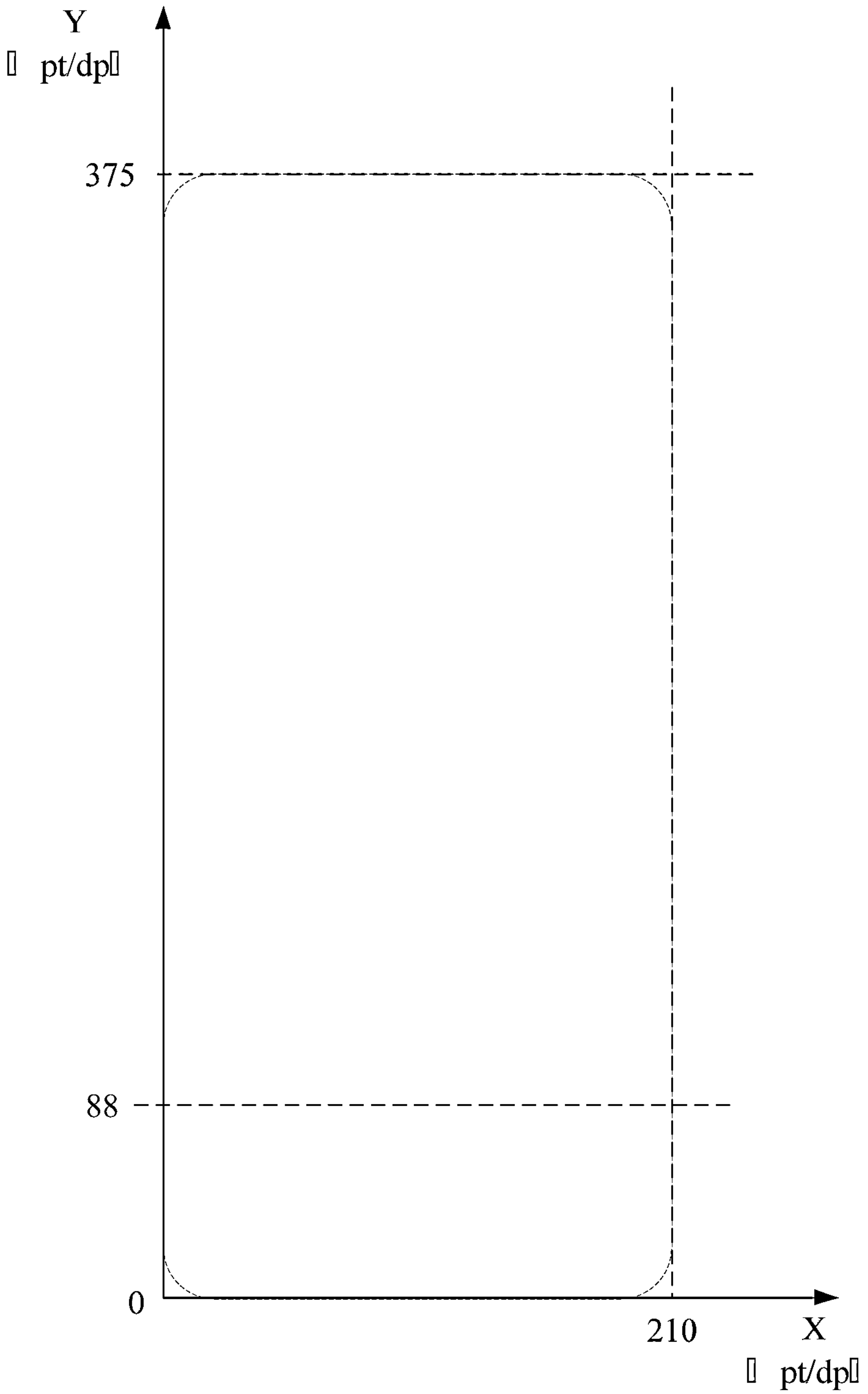
FIG. 2 is a schematic diagram of a position of a preset critical point provided by an embodiment of the present disclosure.

The preset critical point can be determined in accordance with a position of a pixel point on the mobile phone screen. Referring to FIG. 2, assuming that the mobile phone screen has pixels of **375*210, taking a lower left corner of the mobile phone screen as an origin, a rectangular coordinate system is established along two mutually perpendicular edges, where an edge in a vertical direction is a Y axis and an edge in a horizontal direction is an X axis, then a position of the preset critical point may include positions of a plurality of pixels on a straight line with the Y coordinate of n. For example, n=88, then the preset critical point may include positions of a plurality of pixel points with the Y coordinate of 88**.

Herein, in the embodiment shown in FIG. 2, "pt" and "dp" both indicate a pixel unit, and "pt/dp" indicates any pixel unit of "pt" or "dp".

The present disclosure does not limit the implementation of jumping from the profile page to the live room page in the scenario 2.

Exemplarily, when the user starts the drop-down operation from any position of the area 101, and when the drop-down operation has reached the preset critical point, the live room page of the user 1 may be presented on the mobile phone screen in a manner of downward movement.

Figure 1C:
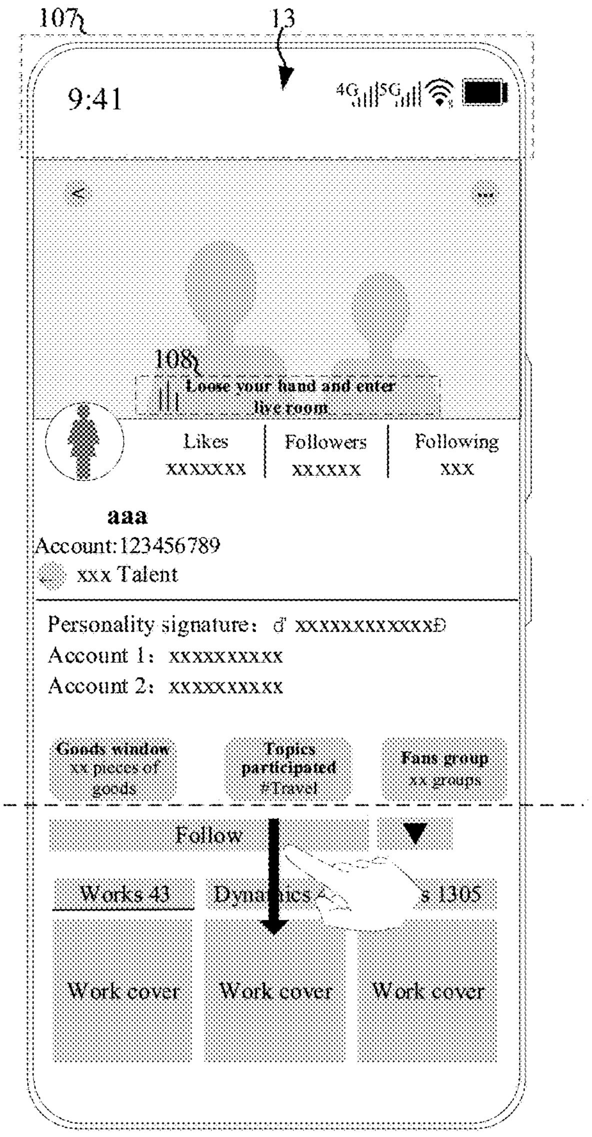

Exemplarily, it is assumed that when the application 1 detects that the drop-down operation has reached and exceeded the preset critical point, the application 1 may, on the mobile phone, exemplarily display a user interface 13 shown in FIG. 1C.

Referring to the user interface 13 shown in FIG. 1C, the profile page displayed in the user interface 13 moves downward with respect to the profile page presented in the user interface 11. Due to the downward movement of the profile page, an area formed by an upper edge of the profile page, an upper edge of the mobile phone screen and two side edges of the mobile phone screen appears, such as an area 107 shown in FIG. 1C, where the live room page of the user 1 can be displayed; since the size of the area 107 cannot fully present the entire content of the live room page, so that part of the image of the live room page can be presented in the area 107, for example, image content corresponding to a position of the area 107 can be cut-out from the image of the live room page and displayed in the area 107.

Assuming that the live room page is as shown in FIG. 1B, the image content corresponding to the area 107 is cut-out in accordance with the content presented in the live room page, wherein the image content corresponding to the area 107 is pure white image content, so that in FIG. 1C, it is the pure white image content in the area 106.

In addition, it should be noted that before the drop-down operation has reached the preset critical point, the application 1 may, on the mobile phone screen, always display the user interface 11 shown in FIG. 1A.

In addition, when the drop-down operation has reached the preset critical point, the application 1 may further display prompt information to prompt the user that the drop-down operation has reached the preset critical point, so that the user can know to end the drop-down operation so that the live room of the user 1 can be entered. The prompt information can be implemented in the manner of a text prompt and/or a vibration prompt.

For example, referring to FIG. 1C, the user interface 13 further includes: an area 108 which is used for displaying text content "loose your hand and enter the live room" to prompt the user that the drop-down operation has reached the preset critical point, and certainly, the text prompt may also be achieved by other text content, and is not limited to the case shown in FIG. 1C.

The present disclosure does not limit the parameters of the area 108, such as display position, size, area color, color, font, and size of text located in the area 108, and the like. For example, as shown in FIG. 1C, the area 108 may be overlapped with the background image area of the profile page and displayed in an upper layer of the background image area.

If the application 1 detects that the drop-down operation ends when the text prompt in the area 108 and the vibration prompt appear, the application 1 may automatically move downwards a non-background image area of the profile page, and then display the live room page of the user 1 on the entire screen of the mobile phone, for example, display the user interface 12 shown in FIG. 1B.

If the preset critical point has been reached, but the application 1 detects that the drop-down operation does not end (if the user does not loose his hand, the application 1 may determine that the drop-down operation does not end), and the user continues sliding down, then, as a distance of the drop-down operation exceeding the preset critical point continuously increases, the area 107 is continuously increased in area, so that there can be more and more related content of the live room page that can be displayed in the area 107.

Figure 1D:
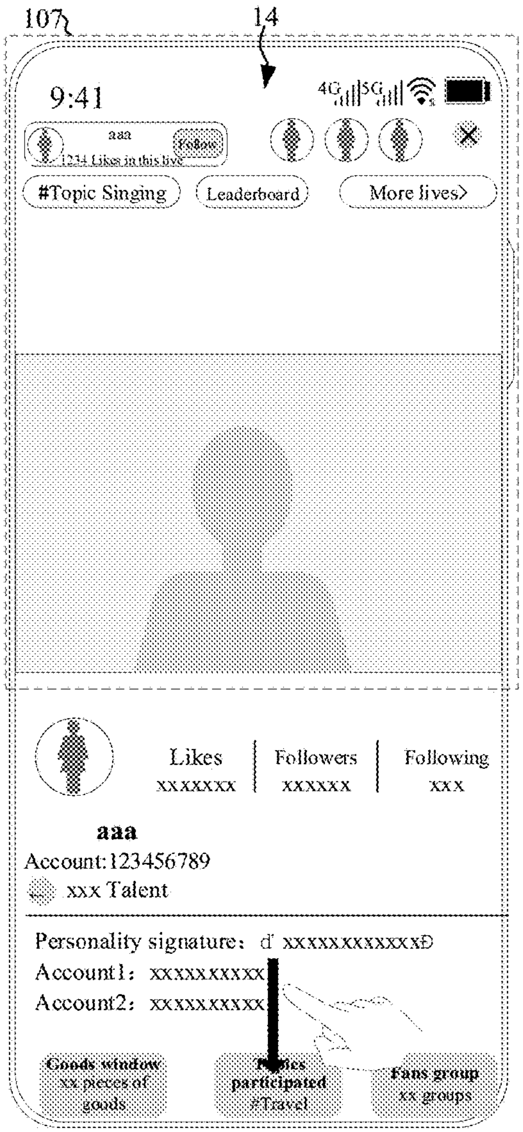

Exemplarily, the application 1 may, on the mobile phone, exemplarily display a user interface 14 as shown in FIG. 1D, where the background image area of the profile page disappears, and further downward movement of the non-background image area of the profile page occurs, and where the non-background image area of the profile page becomes smaller in size, and the area 107 for displaying the related image of the live room page of the user 1 is increased in area.

Furthermore, the prompt information for prompting the user that the drop-down operation has reached the preset critical point may disappear as the area 107 is continuously increased in area. For example, when the area 107 exceeds half of the entire mobile phone screen, the text prompt in the area 108 can disappear and the vibration prompt can also cease.

In the user interface 14 shown in FIG. 1D, with the continuous downward movement of the profile page, the background image area of the profile page disappears, so that the area 107 is increased in area, and the user can focus his vision on the related image of the live room page, which is beneficial to improving the user experience.

As the application 1 detects that the drop-down operation ends and the drop-down operation has reached the preset critical point, the application 1 may automatically move downwards the non-background image area of the profile page, and then display the live room page of the user 1 on the entire screen of the mobile phone, for example, display the user interface 12 shown in FIG. 1B.

In this way, the user can successfully enter the live room page of the user 1 by means of the drop-down operation for the background image area of the profile page.

In some cases, when the user starts to drop down from any position of the area 101, and the application 1 detects that the drop-down operation has not reached the preset critical point when it ends, the application 1 will not jump to the live room page of the user 1, and the application 1 always displays the profile page of the user 1 in the process of inputting the drop-down operation by the user; alternatively, if the drop-down operation input by the user has exceeded the preset critical point but the user does not loose his hand, the application 1 may exemplarily and sequentially display the user interface 13 shown in FIG. 1C and the user interface 14 shown in FIG. 1D described above as the distance of the drop-down operation exceeding the preset critical point increases, and if the user inputs a slide-up operation immediately, the application 1 will not jump to the live room page of the user 1, but return to the user interface 13 of the embodiment shown in FIG. 1C from the user interface 14 shown in FIG. 1D, and when detecting that the slide-up operation ends, the application 1 returns to display the user interface 11 shown in FIG. 1A, that is, when detecting that the slide-up operation ends, the application 1 displays the profile page of the user 1.

In addition, on the basis of the above embodiment shown in FIG. 1A, guidance information may further be displayed in the user interface 11 to prompt the user that the application 1 provides a function of entering the live room of the user 1 from the background image area and guide the user to perform an operation. The present disclosure does not limit the implementation of the guidance information, for example, the guidance information may be implemented by one or more of a text bubble, animation effects, an image, a symbol, or the like. Exemplarily, as shown in FIG. 1A, the user interface 11 further includes: an area a2, which is used for displaying a text bubble, wherein text guidance content "click or drop down to enter the live room" can be displayed in the text bubble, and of course, other text guidance content can also be displayed. The present disclosure does not limit a display position of the guidance information.

Herein, the guide information can be displayed when the user uses the function of entering the live room from the background image area for the first time, or displayed when the user uses the function of entering the live room from the background image area for the first N times, or displayed when the user uses the function of entering the live room from the background image area each time, or can also be displayed never, which is not limited in the present disclosure.

In addition, in the embodiment shown in FIG. 1A, an area for presenting the avatar of the user 1 further provides an entry for entering the live room of the user 1, and in the area for presenting the avatar of the user 1, breathing circle animation effects can be also displayed, through which the user can be prompted that the user 1 is on a live currently. When the application 1 detects a trigger operation for the avatar area of the user 1, the application 1 jumps to the live room page of the user 1, such as the user interface 12 shown in FIG. 1B.

It should be noted that, in the embodiments shown in FIGS. 1A to 1D, the description is made by taking an example that a live of a video performance recorded in real time is being performed in the live room of the user 1. It can be seen in combination with the foregoing description that, the live room of the user 1 may also be a non-stream live room, for example, the live room with a type such as a voice live room, a chat room live room, and the like. Assuming that the live room of the user 1 is a voice live room, an image of the live room may display avatar information, account information, and the like of users currently joining the live room, and the live preview content may be generated in accordance with the image of the live room in a preset manner; the present disclosure does not limit the preset manner, for example, the image of the live room may be cut-out at a preset ratio in accordance with the size of the area 101, and the cut-out image of the live room is displayed in the area 101, or the entire image of the live room is thumbnail-presented in the area 101.

And when the image of the live room of the user 1 changes, the image of the live room that is displayed in the area 101 is updated. For example, in the case of a new user joining the live room of the user 1, a user exiting the live room of the user 1, a user releasing comment information, a user sending out a virtual gift, or the like, the live preview content can be regenerated in accordance with the latest image of the live room and displayed in the area 101.

Figure 1E:
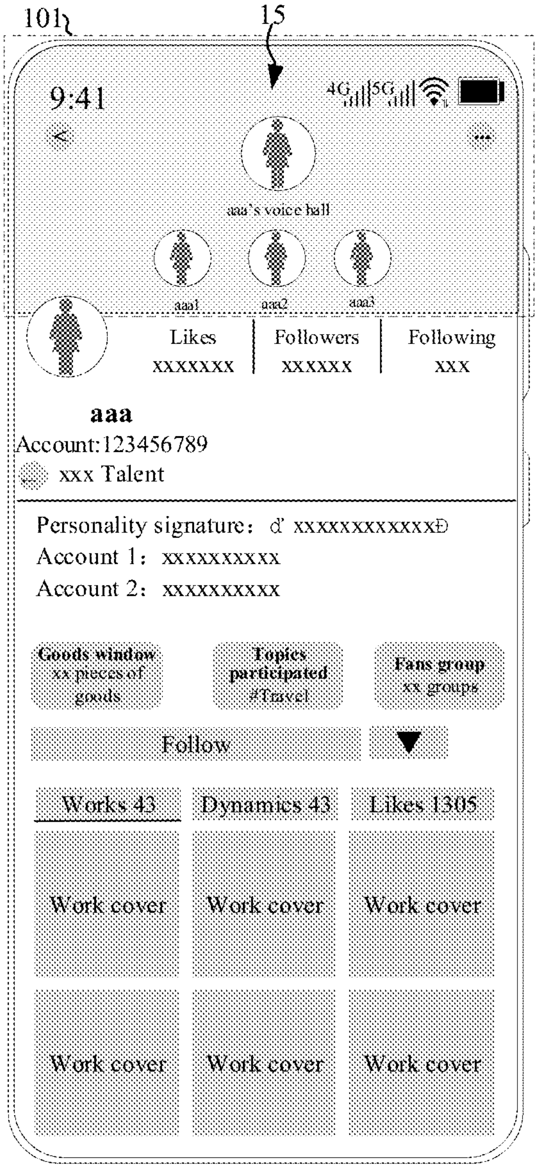

For example, when the live room of the user 1 is a voice live room and a live is being performed in the live room of the user 1, the application 1 may, on the mobile phone, exemplarily display a user interface 15 as shown in FIG. 1E when the profile page of the user 1 is entered. Referring to FIG. 1E, in the user interface 15, the live preview content cut-out in accordance with an image of the voice live room of the user 1 is displayed in an area 101.

Figure 1F:
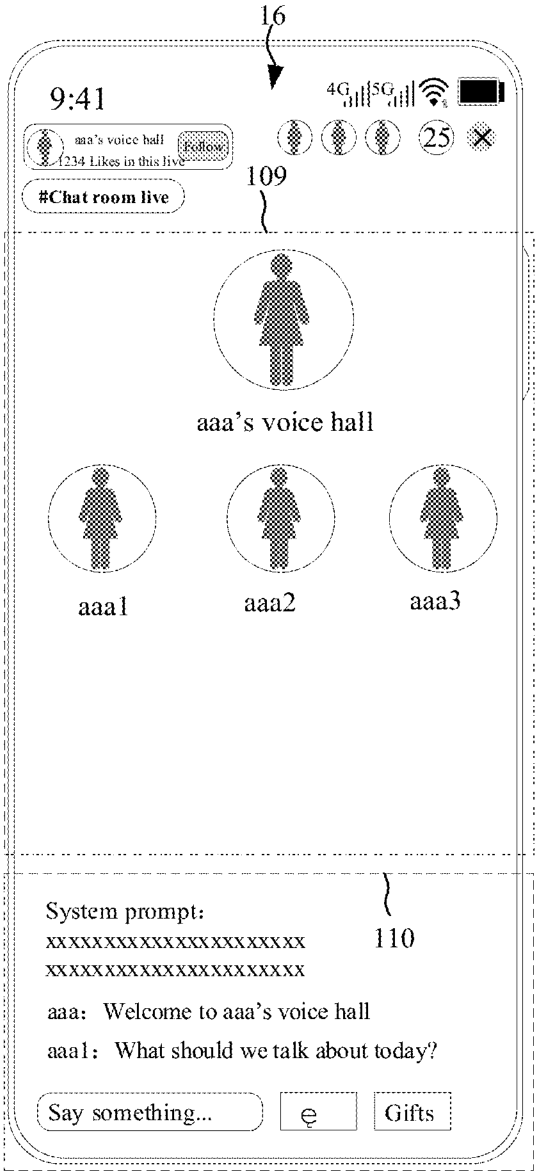

Exemplarily, FIG. 1F exemplarily shows the image of the voice live room of the user 1, i.e., the live room page of the user 1. Referring to a user interface 16 shown in FIG. 1F, in the live room of the user 1, in addition to the user 1, there are 3 users participating therein, which are user “aaa1”, user “aaa2”, and user “aaa3”, respectively, so that in an area 109 of the user interface 16, in addition to that an avatar of the user 1 and a name of the live room of the user 1 are displayed, avatars and names of the user “aaa1”, the user “aaa2” and the user “aaa3” are displayed. Of course, in the area 109, other related content may be further displayed, which is not limited in the present disclosure.

In addition, the user interface 16 may further include an area 110, which is used for presenting comment information of the voice live room of the user 1. A system prompt issued by the application 1 may also be displayed in the user interface 11.

Accordingly, in accordance with the user interface 16 shown in FIG. 1F, image content of the area 109 may be cut-out in accordance with the size of the area 101, and the cut-out image content may be displayed in the area 101, such as the illustration in the user interface 15 provided in the embodiment shown in FIG. 1E. Alternatively, in accordance with the user interface 16 shown in FIG. 1F, the image content of the area 109 may be resized to be matched with the size of the area 101 and displayed in the area 101.

And the implementation of the user entering the user interface 16 through the area 101 in the user interface 15 is similar to the embodiments shown in FIGS. 1A to 1D, so that reference may be made to the detailed description of the foregoing embodiments, which is not repeated herein for brevity.

In accordance with the method for presenting live content, first, the live preview content is presented in the background image area of the profile page, whereby the channel for the user to view the live preview content is enriched and the motivation of the user to enter the live room is raised, and in addition, the entry for entering the live room of the user 1 is provided in the profile page, whereby the channel for entering the live room is enriched, and the user can enter the live room by a plurality of kinds of operations, and the flexibility is high, and the user experience can be improved.

The present disclosure further provides a live content presentation method.

Figure 3:
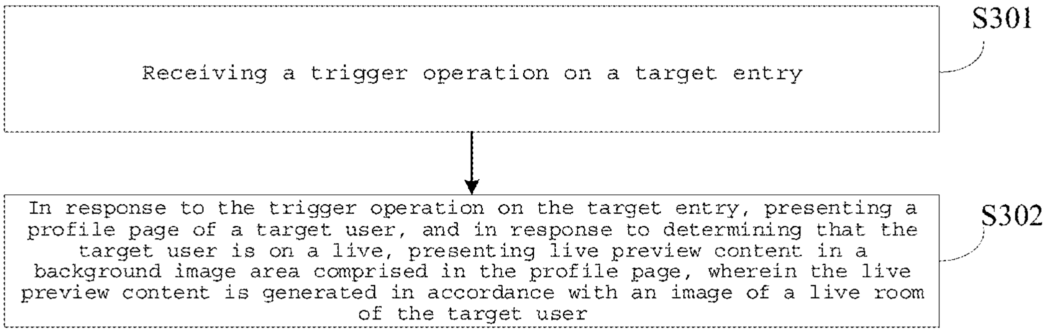
FIG. 3 is a schematic flow diagram of a live content presentation method provided by another embodiment of the present disclosure.

FIG. 3 is a schematic flow diagram of a live content presentation method in accordance with an embodiment of the present disclosure. Referring to FIG. 3, the method provided in this embodiment comprises:

S301, receiving a trigger operation on a target entry. The electronic device has installed thereon an application, by which a profile page of a target user can be entered. Herein, the target entry may include an entry for entering the profile page of the target user that is provided by the application, and the target entry may include an entry in a multimedia content presentation page, an entry in a friend list, an entry in a notification information page, and the like, and of course, may also include an entry provided by another page, which is not limited in the present disclosure.

S302, in response to the trigger operation on the target entry, presenting a profile page of a target user, and in response to determining that the target user is on a live (i.e., on a live stream, or on live streaming), presenting live preview content in a background image area comprised in the profile page, wherein the live preview content is generated in accordance with an image of a live room of the target user.

When the application receives the trigger operation (such as a click operation) on the target entry, the application are displays the profile page of the target user on the electronic device, and the present disclosure does not limit the implementation of the profile page.

Herein, the profile page comprises the background image area, and in the present disclosure, in response to determining that the target user is on a live currently, the live preview content is presented in the background image area of the profile page of the target user, wherein the live preview content is generated in accordance with the image of the live room of the target user.

If, as described above, the live room of the target user may be a live room capable of producing a live stream, then the live preview content is a live preview stream generated in accordance with the live stream (i.e., live content); and, if the live room of the target user is a non-stream live room, then the live preview content can be an image of the live room cut-out in a preset manner.

If the live room of the target user is a live room capable of producing a live stream, the live preview content may be generated in the following manner:

in some implementations, the live content may not be image-processed, and the obtained live content is directly displayed in the background image area.

For example, a size of the background image area is matched with an image size of the live content, and if the size of the background image area is greater than or equal to the image size of the live content, the image size of the live content can be kept unchanged to display the live content in the background image area, which can ensure that the user can view the relatively complete image of the live content from the background image area, thereby helping raising the motivation of the user to enter the live room.

In another implementation, the live content is image-processed to obtain the live preview content, and then the live preview content is presented in the background image area.

For example, by cropping the image of the live content, an image of an area may be selected from the image of the live content for presentation, and when cropping, an image to be presented in the background image area may be obtained by identifying a visual center of gravity of the image of the live content in real time and cropping the image of the live content in accordance with the size of the background image area and the visual center of gravity.

Herein, a most delectable area can be identified and cut-out from the image of the live content by using artificial intelligence technology and real-time tracking is performed, to make sure that the center of gravity of the image of the live content is always presented in the background image area of the profile page. Alternatively, the image of the live content can be zoomed out so that the image of the live content can be thumbnail-presented in the background image area.

The presentation mode of the live content released by the target user in the background image area is not limited in the present disclosure, and can be flexibly set as required. In addition, when the live preview content is presented in the background image area, whether the electronic device is currently in a landscape screen state or a portrait screen state can be considered; for example, when the electronic device is in the portrait screen state, blank-leaving processing can be performed on both sides of the image of the live preview content, and when the electronic device is in the landscape screen state, the image of the live preview content can be made to occupy the entire background image area.

If the live room of the target user is a non-stream live room, the live preview content can be live preview content generated in accordance with the image of the live room in the preset manner; the present disclosure does not limit the preset manner, for example, the image of the live room can be cut-out at a preset ratio in accordance with the size of the background image area, and the cut-out image of the live room can be displayed in the background image area; alternatively, the image of the entire live room is thumbnail-presented in the background image area. For example, as shown in the embodiment of FIG. 1E.

In accordance with the method provided in this embodiment, by receiving a trigger operation on a target entry, presenting a profile page of a target user in response to the trigger operation on the target entry, and in response to determining that the target user is on a live, presenting live preview content in a background image area comprised in the profile page, wherein the live preview content presented in the background image area is generated in accordance with an image of a live room of the target user, the following is achieved: the user can view the live content when entering the profile page of the target user, which enriches the channel for the user to preview the live content, helps raising the motivation of the user to enter the live room page, and improves the user experience.

Figure 4:
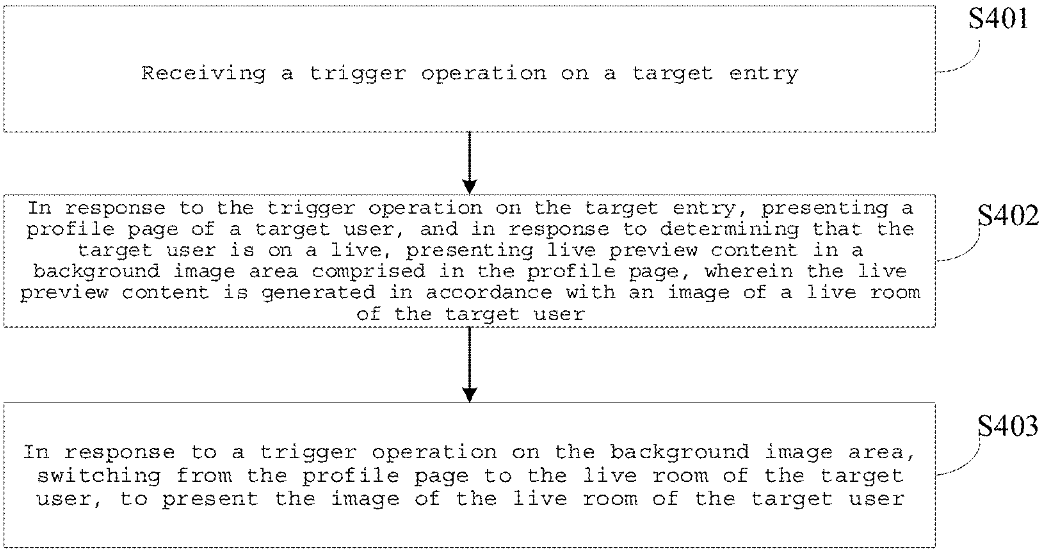
FIG. 4 is a schematic flow diagram of a live content presentation method provided by still another embodiment of the present disclosure.

FIG. 4 is a schematic flow diagram of a live content presentation method provided by another embodiment of the present disclosure. Referring to FIG. 4, the method provided in this embodiment comprises:

S401, receiving a trigger operation on a target entry;

S402, in response to the trigger operation on the target entry, displaying a profile page of a target user, and in response to determining that the target user is on a live, presenting live preview content in a background image area comprised in the profile page, wherein the live preview content is generated in accordance with an image of a live room of the target user.

The steps S401 and S402 in this embodiment are similar to the steps S301 and S302 in the embodiment shown in FIG. 3, respectively, so that reference can be made to the detailed description of the embodiment shown in FIG. 3, which is not repeated herein for brevity.

S403, in response to a trigger operation on the background image area, switching from the profile page to the live room of the target user, to present the image of the live room of the target user.

In combination with the foregoing description, the user may, by inputting a click operation or a drop-down operation for the background image area, cause an application to display the live room page of the target user on an electronic device, so that the user views the live content released by the target user through the live room page of the target user.

If the live room of the target user is entered by the click operation on the background image area, the application determines whether a position clicked by the user is inside the background image area in accordance with the click operation of the user, and if it is determined that the position clicked by the user is inside the background image area, jumps to a live room page of the target user, that is, enters the live room of the target user. That is, this corresponds to the case of the forgoing scenario 1, and reference may be made to the detailed description above, which is not repeated herein for brevity.

If the live room of the target user is entered by the drop-down operation on the background image area, the application jumps to the live room page of the target user if it detects that the drop-down operation has reached or exceeded a critical point when it ends; the present disclosure does not limit the manner of jumping from the profile page to the live room page, for example, the live room page can be presented in a manner of downward movement. That is, this corresponds to the case of the forgoing scenario 2, and reference may be made to the detailed description above, which is not repeated herein for brevity.

In addition, if the application detects that the drop-down operation has not reached a preset critical point, the application may always display the profile page of the target user. If the user inputs the drop-down operation, does not loose his hand, no matter whether the drop-down operation has exceeded the preset critical point, and continuously inputs a slide-up operation, then the application can move downwards the live room page with the drop-down operation, without jumping to the live room page, and return to the profile page of the target user with the slide-up operation.

It should be noted that, in the process of the user inputting the drop-down operation, when the preset critical point has been reached, the application may further present a prompt message to prompt the user that the drop-down operation has reached the preset critical point, and the prompt message may be implemented in the manner of a text prompt and/or a vibration prompt; for example, as to the case of the embodiment shown in FIG. 1C, reference may be made to the detailed description of the embodiment shown in FIG. 1C.

In accordance with the method provided in this embodiment, by receiving a trigger operation on a target entry, presenting a profile page of a target user in response to the trigger operation on the target entry, and in response to determining that the target user is on a live, presenting live preview content in a background image area comprised in the profile page, wherein the live preview content presented in the background image area is generated in accordance with an image of a live room of the target user, the following is achieved: the user can view the live content when entering the profile page of the target user, which enriches the channel for the user to preview the live content, and helps raising the motivation of the user to enter the live room page. In addition, by providing an entry for entering the live room of the target user in the background image area of the profile page, the channel for the user to enter the live room is enriched, and the user can enter the live room by a plurality of kinds of operations, and the flexibility is high, and the user experience can be improved.

Exemplarily, an embodiment of the present disclosure further provides an apparatus for presenting live content.

Figure 5:
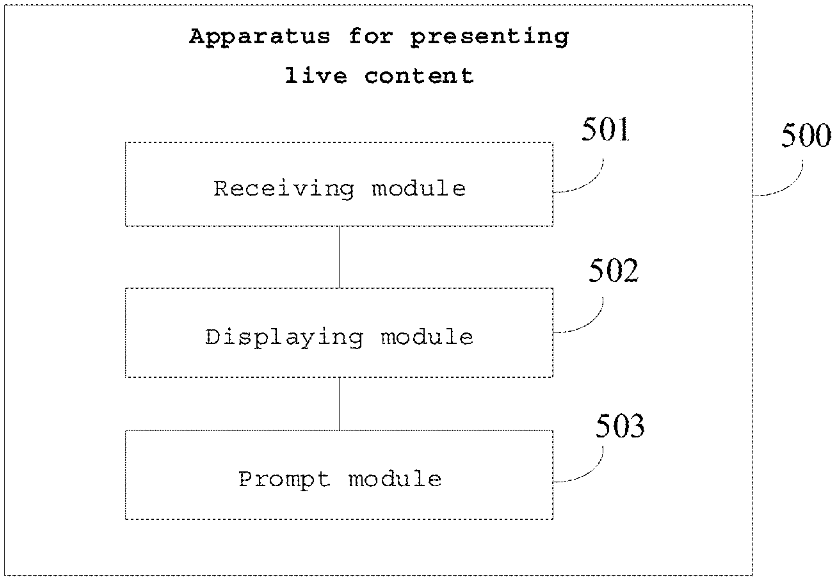
FIG. 5 is a schematic structural diagram of a live content presentation apparatus provided by an embodiment of the present disclosure.

FIG. 5 is a schematic structural diagram of an apparatus for presenting live content in accordance with an embodiment of the present disclosure. Referring to FIG. 5, the apparatus 500 for presenting live content provided in this embodiment comprises:

a receiving module 501 configured to receive a trigger operation on a target entry.

A displaying module 502 configured to, in response to the trigger operation on the target entry, present a profile page of the target user, and in response to determining that the target user is on a live, present live preview content in a background image area comprised in the profile page; wherein the live preview content is generated in accordance with an image of a live room of the target user.

In some implementations, the displaying module 502 is further configured to, in response to a trigger operation on the background image area comprised in the profile page, switch from the profile page to the live room of the target user, to present the image of the live room of the target user.

In some implementations, the displaying module 502 is specifically configured to, in response to a click operation on the background image area, switch from the profile page to the live room of the target user.

In some implementations, the displaying module 502 is specifically configured to, in response to a drop-down operation on the background image area, determine whether the drop-down operation has reached a preset critical point when it ends; and if it is determined that the drop-down operation has reached the preset critical point when it ends, switch from the profile page to the live room of the target user.

In some implementations, the apparatus for presenting live content 500 further comprises: a prompt module 503.

The prompt module 503 is configured to prompt that the drop-down operation has reached the preset critical point.

In some implementations, the prompt module 503 is specifically configured to prompt, in the manner of a text prompt and/or a vibration prompt, that the drop-down operation has reached the preset critical point.

If the prompt is achieved via the text, the prompt module 503 is specifically configured to control the displaying module 502 to present corresponding text prompt content; and If the prompt is achieved via the vibration, the prompt module 503 is specifically configured to control an electronic device to vibrate.

In some implementations, the live preview content is obtained by cropping the image of the live room of the target user in accordance with a size of the background image area.

In some implementations, the live preview content is obtained by identifying a visual center of gravity of the image of the live room of the target user and cropping the image of the live room of the target user in accordance with the size of the background image area and the visual center of gravity.

In some implementations, the live preview content is obtained by zooming out the image of the live room of the target user in accordance with a size of the background image area.

The apparatus for presenting live content provided in this embodiment may be configured to perform the technical solution of any of the foregoing method embodiments, and have similar implementation principle and technical effects, so that reference can be made to the detailed description of the foregoing method embodiments, which is not repeated herein for brevity.

Exemplarily, an embodiment of the present disclosure further provides an electronic device.

Figure 6:
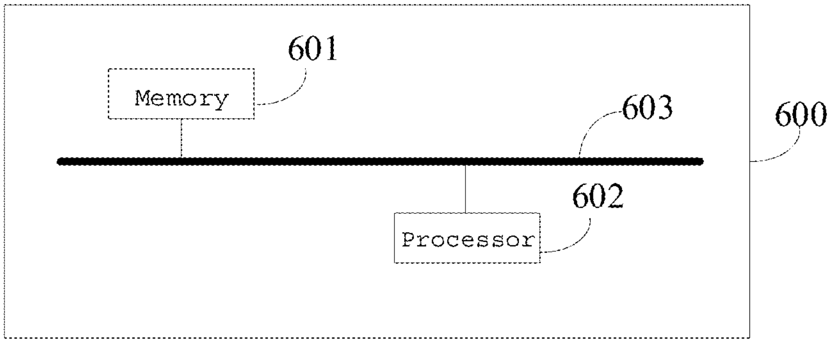
FIG. 6 is a schematic structural diagram of an electronic device provided by an embodiment of the present disclosure.

FIG. 6 is a schematic structural diagram of an electronic device in accordance with an embodiment of the present disclosure. Referring to FIG. 6, the electronic device 600 provided in this embodiment comprises: a memory 601 and a processor 602.

Herein, the memory 601 may be a separate physical unit, and may be connected with the processor 602 by a bus 603. The memory 601 and the processor 602 may also be integrated together, implemented by hardware, or the like.

The memory 601 is configured to store program instructions, and the processor 602 calls the program instructions to perform the method for presenting live content provided in any of the method embodiments above.

In some embodiments, when part or all of the method of any of the above embodiments is implemented by software, the above electronic device 600 may also include only the processor 602. The memory 601, which is configured to store a program, is located outside the electronic device 600, and the processor 602, which is connected with the memory via a circuit/wire, is configured to read and execute the program stored in the memory.

The processor 602 may be a central processing unit (CPU), a network processor (NP), or a combination of the CPU and the NP.

The processor 602 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 601 may include a volatile memory (volatile memory), such as a random-access memory (RAM); the memory may also include a non-volatile memory, such as a flash memory, a hard disk drive (HDD) or a solid-state drive (SSD); and the memory may also include a combination of the above kinds of memories.

The present disclosure further provides a readable storage medium, comprising: computer program instructions which, when executed by at least one processor of an electronic device, cause the electronic device to implement the method for presenting live content provided in any of the method embodiments above.

The present disclosure further provides a computer program product which, when being run on a computer, causes the computer to implement the method for presenting live content provided in any of the method embodiments above.

It should be noted that, relational terms such as "first" and "second", herein, are only used for distinguishing one entity or operation from another entity or operation without necessarily requiring or implying any such actual relation or order between these entities or operations. Moreover, the term "comprise", "include", or any other variation thereof, is intended to encompass a non-exclusive inclusion, such that a process, method, article, or device including a list of elements includes not only those elements but also other elements not expressly listed, or elements inherent to such a process, method, article, or device. Without more limitations, an element defined by a statement "including one . . . " does not exclude the presence of another identical element in the process, method, article, or device that includes the element.

The above contents are only specific implementations of the present disclosure, which enable those skilled in the art to understand or implement the present disclosure. Various modifications to these embodiments will be apparent to those skilled in the art, and the general principles defined herein may be implemented in other embodiments without departing from the spirit or scope of the present disclosure. Therefore, the present disclosure will not be limited to these embodiments described herein, but conform to the widest scope consistent with the principles and novel features disclosed herein.

What is claimed is:

1. A method for presenting live content, comprising:
   in response to a user being not on a live, presenting a background image corresponding to the user in a background image area at the top of a profile page of the user, and in response to the user being on a live, replacing the background image in the background image area at the top of the profile page of the user with live preview content; wherein the live preview content is generated in accordance with an image of a live stream of the user; and wherein in response to the user being on a live, guidance information is displayed in the background image area, the guidance information being used for guiding to enter the live stream of the user via a pull-down operation on the background image area; and
   in response to the pull-down operation on the background image area in which the live preview content is presented reaching a preset critical point when it ends, entering the live stream of the user,
   wherein in response to a continuous increase in a distance by which the pull-down operation exceeds the preset critical point while a hand remains unloosed, the profile page of the user is moved downward, and additional content related to the live stream is displayed above an upper edge of the background image area at the top of the profile page of the user, and the displayed additional content comprises a follow button for an account associated with the live stream of the user, a view count of the live stream of the user, and a topic of the live stream of the user, such that a viewing user determines whether to enter the live stream of the user based on the displayed additional content, and
   in response to the viewing user determining not to enter the live stream of the user based on the displayed additional content, and in response to a continued slide-up operation being performed while the pull-down operation has been performed and the hand remains unloosed, returning to the profile page of the user without entering the live stream of the user.

2. The method according to claim 1, further comprising:
   prompting that the pull-down operation has reached the preset critical point.

3. The method according to claim 2, wherein prompting that the pull-down operation has reached the preset critical point comprises:
   prompting, in the manner of at least one of a text prompt or a vibration prompt, that the pull-down operation has reached the preset critical point.

4. The method according to claim 1, wherein the live preview content is obtained by cropping the image of the live stream of the user in accordance with a size of the background image area.

5. The method according to claim 4, wherein the live preview content is obtained by identifying a visual center of gravity of the image of the live stream of the user and cropping the image of the live stream of the user in accordance with the size of the background image area and the visual center of gravity.

6. The method according to claim 1, wherein the live preview content is obtained by zooming out the image of the live stream of the user in accordance with a size of the background image area.

7. An electronic device, comprising: a memory and a processor,
   wherein the memory is configured to store computer program instructions, and
   the processor is configured to execute the computer program instructions to implement the following operations for presenting live content:
   in response to a user being not on a live, presenting a background image corresponding to the user in a background image area at the top of a profile page of the user, and in response to the user being on a live, replacing the background image in the background image area at the top of the profile page of the user with live preview content; wherein the live preview content is generated in accordance with an image of a live stream of the user; and wherein in response to the user being on a live, guidance information is displayed in the background image area, the guidance information being used for guiding to enter the live stream of the user via a pull-down operation on the background image area; and
   in response to the pull-down operation on the background image area in which the live preview content is presented reaching a preset critical point when it ends, entering the live stream of the user,
   wherein in response to a continuous increase in a distance by which the pull-down operation exceeds the preset critical point while a hand remains unloosed, the profile page of the user is moved downward, and additional content related to the live stream is displayed above an upper edge of the background image area at the top of the profile page of the user, and the displayed additional content comprises a follow button for an account associated with the live stream of the user, a view count of the live stream of the user, and a topic of the live stream of the user, such that a viewing user determines whether to enter the live stream of the user based on the displayed additional content, and
   in response to the viewing user determining not to enter the live stream of the user based on the displayed additional content, and in response to a continued slide-up operation being performed while the pull-down operation has been performed and the hand remains unloosed, returning to the profile page of the user without entering the live stream of the user.

8. The electronic device according to claim 7, wherein the processor is configured to execute the computer program instructions to further implement the following operation:
   prompting that the pull-down operation has reached the preset critical point.

9. The electronic device according to claim 8, wherein prompting that the pull-down operation has reached the preset critical point comprises:
   prompting, in the manner of at least one of a text prompt or a vibration prompt, that the pull-down operation has reached the preset critical point.

10. The electronic device according to claim 7, wherein the live preview content is obtained by cropping the image of the live stream of the user in accordance with a size of the background image area.

11. The electronic device according to claim 10, wherein the live preview content is obtained by identifying a visual center of gravity of the image of the live stream of the user and cropping the image of the live stream of the user in accordance with the size of the background image area and the visual center of gravity.

12. The electronic device according to claim 7, wherein the live preview content is obtained by zooming out the image of the live stream of the user in accordance with a size of the background image area.

13. A non-transitory computer-readable storage medium, comprising: computer program instructions, wherein the computer program instructions, when executed by at least one processor of an electronic device, cause the electronic device to implement the following operations for presenting live content:

in response to a user being not on a live, presenting a background image corresponding to the user in a background image area at the top of a profile page of the user, and in response to the user being on a live, replacing the background image in the background image area at the top of the profile page of the user with live preview content; wherein the live preview content is generated in accordance with an image of a live stream of the user; and wherein in response to the user being on a live, guidance information is displayed in the background image area, the guidance information being used for guiding to enter the live stream of the user via a pull-down operation on the background image area; and in response to the pull-down operation on the background image area in which the live preview content is presented reaching a preset critical point when it ends, entering the live stream of the user, wherein in response to a continuous increase in a distance by which the pull-down operation exceeds the preset critical point while a hand remains unloosed, the profile page of the user is moved downward, and additional content related to the live stream is displayed above an upper edge of the background image area at the top of the profile page of the user, and the displayed additional content comprises a follow button for an account associated with the live stream of the user, a view count of the live stream of the user, and a topic of the live stream of the user, such that a viewing user determines whether to enter the live stream of the user based on the displayed additional content, and in response to the viewing user determining not to enter the live stream of the user based on the displayed additional content, and in response to a continued slide-up operation being performed while the pull-down operation has been performed and the hand remains unloosed, returning to the profile page of the user without entering the live stream of the user.

14. The non-transitory computer-readable storage medium according to claim 13, wherein the computer program instructions, when executed by the at least one processor of the electronic device, cause the electronic device to further implement the following operation:

prompting that the pull-down operation has reached the preset critical point.

15. The non-transitory computer-readable storage medium according to claim 14, wherein prompting that the pull-down operation has reached the preset critical point comprises:

prompting, in the manner of at least one of a text prompt or a vibration prompt, that the pull-down operation has reached the preset critical point.

16. The non-transitory computer-readable storage medium according to claim 13, wherein the live preview content is obtained by cropping the image of the live stream of the user in accordance with a size of the background image area.

17. The non-transitory computer-readable storage medium according to claim 16, wherein the live preview content is obtained by identifying a visual center of gravity of the image of the live stream of the user and cropping the image of the live stream of the user in accordance with the size of the background image area and the visual center of gravity.

* * * * *